March 26, 1963 A. D. STOLLE 3,083,272
OVEN CONTROL MEANS
Filed Nov. 3, 1959 3 Sheets-Sheet 1
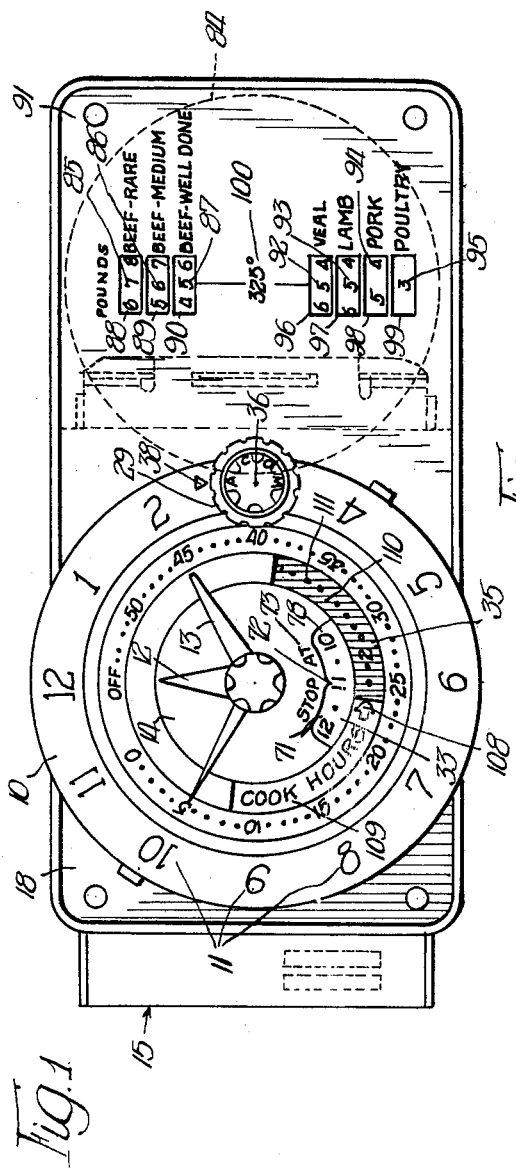
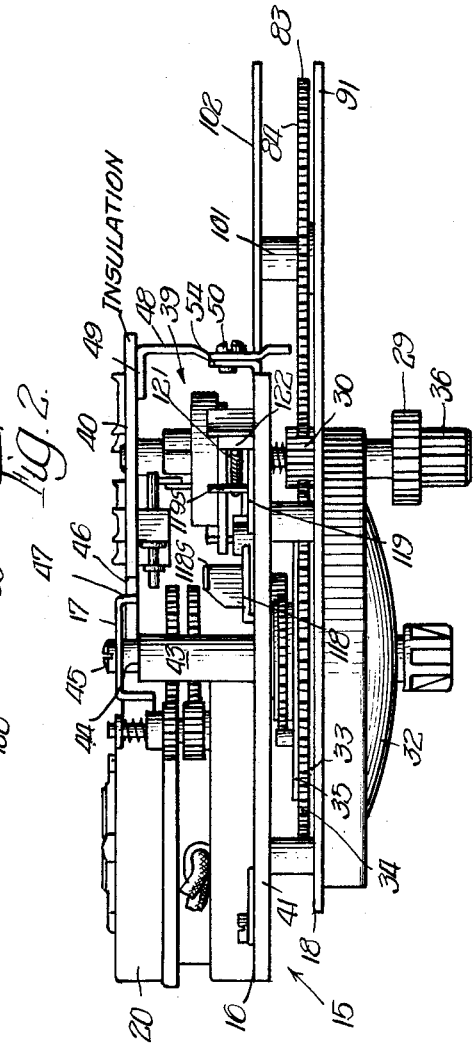
INVENTOR.
Anthony Dan Stolle,
BY
Robert R. Lockwood
Atty.

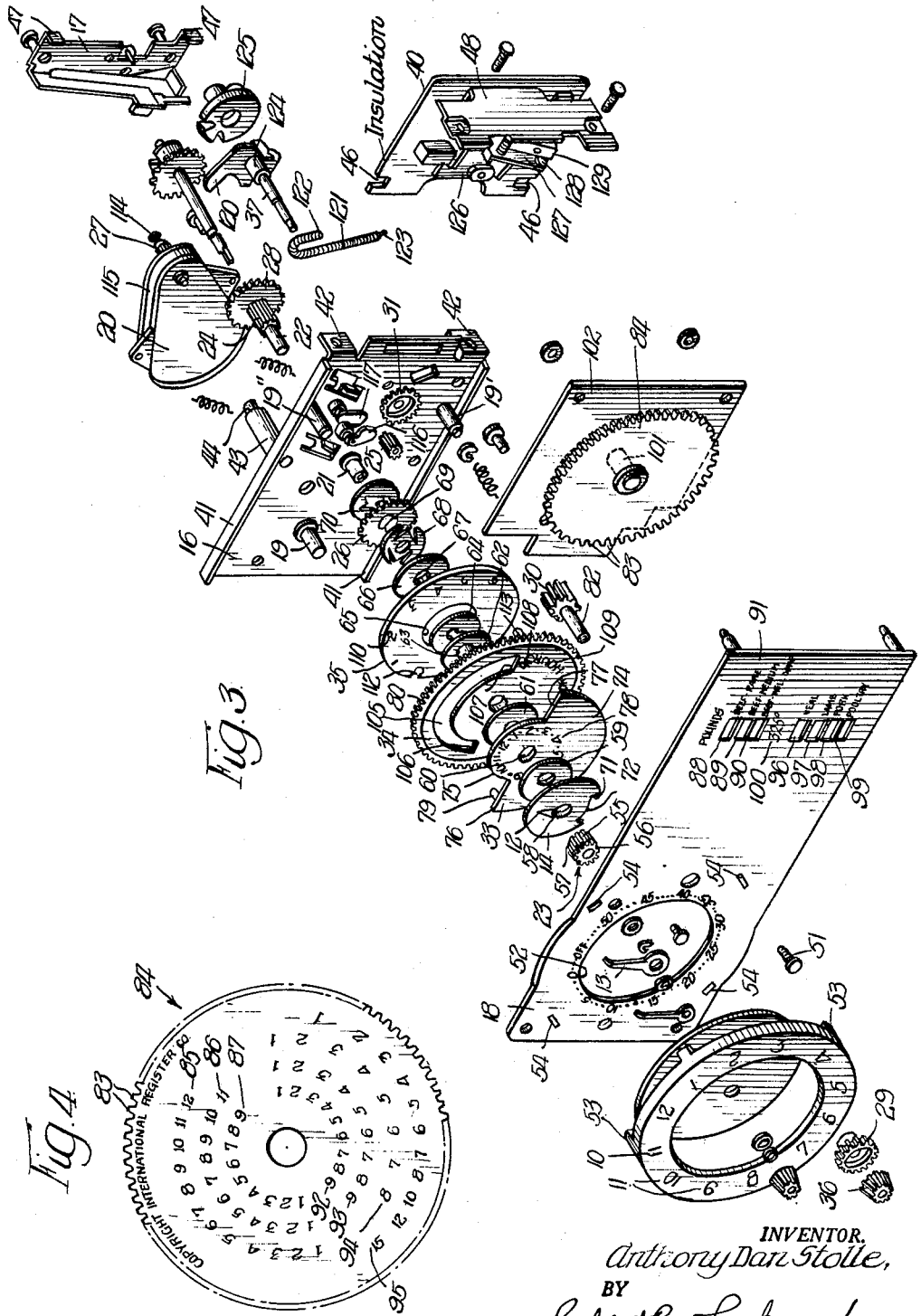

March 26, 1963 — A. D. STOLLE — 3,083,272
OVEN CONTROL MEANS
Filed Nov. 3, 1959
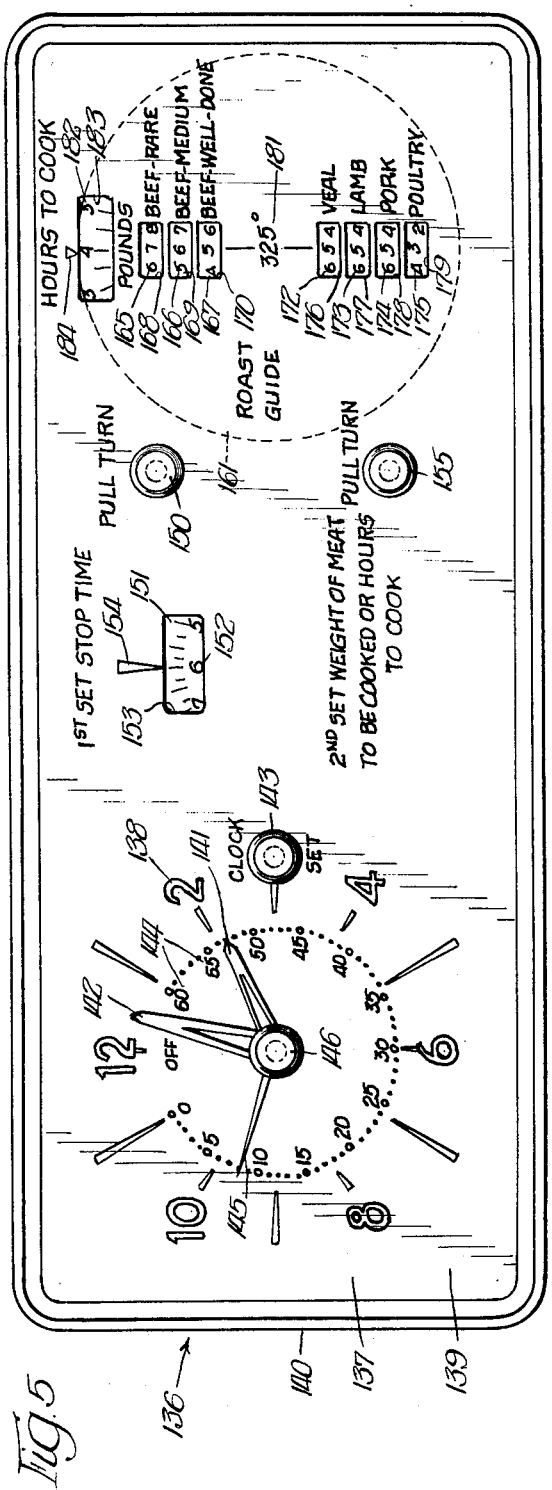
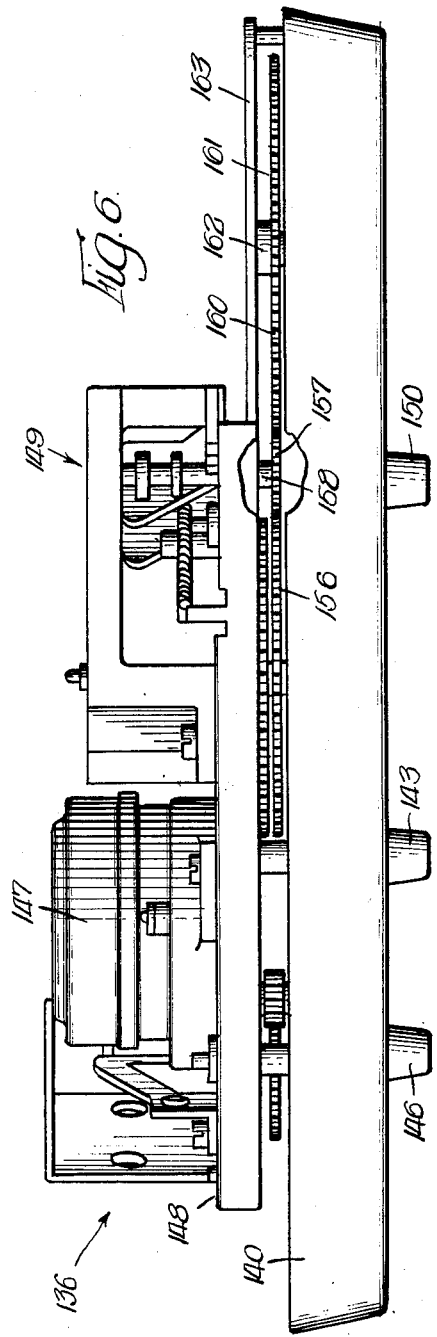
INVENTOR.
Anthony Dan Stolle,
BY Robert R. Lockwood
atty

United States Patent Office 3,083,272
Patented Mar. 26, 1963

3,083,272
OVEN CONTROL MEANS
Anthony Dan Stolle, Deerfield, Ill., assignor to International Register Company, Chicago, Ill., a corporation of Illinois
Filed Nov. 3, 1959, Ser. No. 850,561
2 Claims. (Cl. 200—38)

This invention relates, generally, to timing mechanisms and it has particular relation to the control of ovens employed for baking or roasting food products, such as various kinds of meat. Also, it can be used for controlling other heating means, such as a surface heating unit or burner, where there is a relationship between the character of the food product being cooked and the heating characteristics of the heating means. This invention is illustrated herein as applied to the timing mechanism disclosed in Patent No. 2,886,106, issued May 12, 1959, and also to the timing mechanism disclosed in application Serial No. 689,877, filed October 14, 1957, now U.S. Patent No. 3,038,040, and assigned to the assignee of this application.

Among the objects of this invention are: To provide for preselecting the time required to bake or roast a food product, such as meat and poultry, in a new and improved manner; to select the time required for baking or roasting the food product by adjusting a member with respect to a scale graduated in units of weight of the food product; to preset the time that the baking or roasting operation is to be completed and also to preset the time that the operation is to be initiated with reference to indicia related to weights of food product to be baked or roasted; to provide in timing mechanism a plurality of scales of weight, each scale corresponding to a different degree to which the food product is to be baked or roasted; to provide in timing mechanism a plurality of scales of weight, each scale corresponding to a different kind of food product; to provide in timing mechanism all of these scales on a single dial; and to provide on such a single dial a further scale indicating the number of hours required to complete the baking or roasting operation for a given selection of weight of food product.

Other objects of this invention will, in part, be obvious and in part appear hereinafter.

This invention is disclosed in the embodiments thereof shown in the accompanying drawings and it comprises the features of construction, combination of elements and arrangement of parts that will be exemplified in the constructions hereinafter set forth and the scope of the application of which will be indicated in the appended claims.

For a more complete understanding of the nature and scope of this invention reference can be had to the following detailed description, taken together with the accompanying drawings, in which:

FIGURE 1 is a view, in front elevation, of a range timer arranged to control energy supplied from electricity, gas or the like for heating an oven and in which the present invention is embodied, this figure corresponding generally to FIGURE 1 of the patent above referred to;

FIGURE 2 is a top plan view of the timer shown in FIGURE 1, this view corresponding, generally, to FIGURE 3 of the patent above referred to;

FIGURE 3 is an exploded perspective view of many of the parts making up the timer shown in FIGURES 1 and 2 of the drawings, this view corresponding, generally, to FIGURE 4 of the patent above referred to;

FIGURE 4 is a view in front elevation and at full scale of a cook chart dial constructed and calibrated in accordance with this invention;

FIGURE 5 is a view, in front elevation, showing the present invention applied to the timing mechanism disclosed in the application above referred to, this figure corresponding, generally, to FIGURE 1 of that application; and FIGURE 6 is a top plan view of the construction shown in FIGURE 5, this figure corresponding, generally, to FIGURE 3 of the application above referred to.

In describing the timing mechanism illustrated in FIGURES 1, 2 and 3 of the drawings, reference will be made herein to parts which correspond identically or substantially to parts shown and described in the patent above referred to. Only those parts will be described herein which have a particular bearing on the present embodiment of the herein disclosed invention and reference will be made to the patent in various instances for a more complete description of the character and operation of certain parts. No attempt will be made to employ the same reference characters herein as are employed in the above patent, although the showing of the majority of the parts is identical.

Referring now particularly to FIGURES 1, 2 and 3 of the drawings forming a part of this application, it will be observed that the oven control means includes a clock dial 10 having the twelve conventional hour numerals 11 around its periphery. Rotating within this clock dial 10 are an hour hand 12 and a minute hand 13, the hour hand 12 being imprinted on or otherwise carried by an hour hand dial 14. The various parts of the assembly are mounted on a frame structure 15 comprising a main frame plate 16 disposed in an intermediate plane of the assembly, together with a rear bearing plate 17. These intermediate and rear plates 16 and 17 are supplemented by a front mounting plate 18, which is secured to the main frame plate 16 by three spacing posts 19, 19' and 19''. An alternating current synchronous motor 20 is mounted on the back side of the main frame plate 16. Staked substantially centrally in the main frame plate 16 and passing therethrough is a relatively long tubular bearing bushing or sleeve or hub 21, which constitutes the main bearing support for practically all of the rotating parts that are concentric of the clock dial 10. For example, a minute hand shaft or sleeve 22 which supports and drives the minute hand 13, passes axially through the inside of this main tubular mounting hub 21, having internal bearing supports therein. Conversely, a splined arbor 23, which mounts and drives the hour hand 12, passes axially over the outside of the mounting hub 21, having external bearing supports thereon. The minute and hour hands 13 and 12 of the clock assembly are geared together in the proper ratio by a gear train which comprises in part gears 24, 25 and 26. The time controlled drive of the synchronous electric motor 20 is transmitted to the clock hands 12 and 13 through a motor pinion 27 which meshes with a large gear 28 mounted concentrically of the minute hand sleeve or arbor 22. The rotation of the large gear 28 is transmitted to the gear-train gear 24 and to the minute hand arbor 22 through a friction slippage clutch so as to permit manual setting of the clock hands 12 and 13 in either direction without having to drive back through any of the reduction gearing in the synchronous electric motor unit 20. The manual setting of the clock hands is adapted to be performed through a laterally disposed knob 29 connecting with a setting pinion 30 which is shiftable axially into mesh with a gear 31 whereby manual rotation of the knob 29, when pushed inwardly, can be made operative to set the clock hands 12 and 13 through the train of reducing gearing connected thereto. The clock hands 12 and 13 are covered by a conventional cover glass 32.

Referring to the parts of the mechanism which appear at the front portion thereof, it will be seen from FIGURES 2 and 3 that the mechanism comprises a sequence of dials all disposed behind the front dial 14 which carries the hour hand 12 and all mounted on the same splined arbor 23 that mounts the hour hand dial 14. These dials include a manually settable stop (stop-cooking) dial 33, a manually settable start (cooking-hours) dial 34, and a masking dial 35 disposed behind the cooking-hours dial 34. The stop dial 33 carries a circularly arranged series of numerals which are presented in a sight window in the hour hand dial 14 for denoting the stop-cooking time. The masking dial 35 carries a semi-circular ring of numerals and an associated color band which are presented in a sight window defined by or associated with the cooking-hours start dial 34 for denoting the number of cooking hours which have been manually pre-set on the timer. The manual pre-setting of the stop-cooking dial 33 and of the cooking-hours dial 34 is accomplished through the same knob 29 which is operable to set the clock hands, this knob 29 being located at the right side of the clock dial 10, and disposed forwardly thereof (FIGURE 2). A second knob 36 of smaller diameter than the knob 29 is disposed in front of the knob 29 for operation independently thereof, this front knob 36 being mounted on a switch actuating shaft 37. This other knob 36 serves to manually operate the shaft 37 and also to indicate the position then occupied by the shaft. As shown in FIGURE 1, the front face of the small knob 36 is provided with the four angularly spaced letters A—C—O—M representing: Automatic—Cooking—Off—Manual. That letter of the series which is uppermost on the knob 36, in registration with a stationary index mark 38 on the clock dial 10 indicates the position then occupied by the switch controlling shaft 37 and its switch actuating cam apparatus; viz., since the letter A is uppermost in the position shown in FIGURE 1, the switch setting cam is then in its "Automatic" (or "Set") position.

The alternating current synchronous motor 20 which is operatively connected to transmit timed rotation to the minute hand 13 and to the hour hand 12 (and its dial 14), also normally transmits time controlled rotation to the time selecting dials 33, 34 and 35 through the splined arbor 23. The main control switch of the timer, which responds to the pre-set times set up on the time selection dials 33 and 34 or to the weight set up on a cook chart dial referred to hereinafter, is indicated in its entirety at 39 in FIGURE 2 of the drawings.

Referring now more particularly to the details of construction of the timing mechanism, it will be observed that all of the previously described elements have mounting on the aforementioned frame plates 16, 17 and 18 and also on a rearwardly disposed insulating panel 40. The main or intermediate frame plate 16 is in the form of a rectangular flat stamping having forwardly projecting stiffening flanges 41 along its top and bottom edges, and also having rearwardly projecting mounting lugs 42 at its right hand end, for a purpose to be later described. Staked to the upper and lower portions of the frame plate 16, substantially midway between its ends, are rearwardly projecting spacing posts 43 which support the left hand edge of the insulating panel 40. The rear ends of these spacing posts 43 are reduced to form annular shoulders 44 against which the adjacent edge of the insulating panel 40 bears. This edge of the insulating panel 40 is locked against the annular shoulders 44 by the metallic bearing plate 17 which is secured to the outer ends of the spacing posts in the position overlying the back side of the insulating panel 40, such bearing plate 17 being secured by screws 45 which thread into tapped bores in the outer ends of the spacing posts. As best shown in FIGURE 2, the insulating panel has notches 46 blanked out of its top and bottom edges, and the metallic bearing plate 17 is provided with forwardly bent lugs 47 which hook into the notches 46 in the insulating panel 40 and thus hold the lateral panel against sidewise displacement off the bearing shoulders 44. In the particular embodiment disclosed, the right hand end of the insulating panel 40 is supported by a metallic end plate 48 which has an inwardly turned flange 49 at its outer edge suitably riveted to the insulating panel 40, the forward portion of this end plate 48 being secured to the rearwardly bent lugs 42 of the frame plate 16 by screws 50.

Referring now particularly to FIGURES 2 and 3 of the drawings, it will be seen that the front side of the main frame plate 16 is provided with the forwardly projecting posts 19, 19′ and 19″, the front ends of which are internally threaded for receiving mounting screws. Mounted on the front ends of these spacing posts by screws 51 is the front mounting plate 18. This plate 18 has a large central opening 52 therein for exposing the clock hands 12 and 13 and the time selecting dials 33, 34 and 35. Disposed in front of the plate 18 is the annular clock dial 10, preferably in the form of a circular escutcheon ring. Projecting rearwardly from the escutcheon ring are lugs 53 (FIGURE 3) which are adapted to pass through slotted apertures 54 in the plate 18, these lugs then being bent over on the back side of the plate 18 to secure the clock dial escutcheon ring 10 to the plate 18. The cover glass 32 is held in place between the escutcheon ring 10 and the plate 18.

Referring now to the bearing mounting of the clock hands, time selecting dials, etc., on the main structure 15, it will be seen from FIGURE 3 that the main bearing bushing or sleeve 21 is staked in the center of the frame plate 16 and projects forwardly therefrom. Rotatably journaled on the outer surface of this stationary main bearing 21 is the tubular splined hub or arbor 23 which rotates with a continuous rotation, time driven at the rate of one revolution each 12 hours, and which mounts and frictionally drives the hour hand dial 14, the stop dial 33, and the cooking-hours dial 34. It will be seen that this splined arbor 23 comprises a shank portion 55 and an enlarged head or end portion 56. Toothed splines 57 run the entire length of the tubular arbor 23. These splines are evenly spaced around the arbor substantially in the form of gear teeth through which the time driven drive is transmitted to the arbor and also through which the above friction drive is transmitted from the arbor to the dials 14, 33 and 34 by way of friction disks having keyed engagement with the spline. As shown in FIGURE 3, the hour hand dial 14 has a central circular opening 58 therein which can slip freely over the splines 57 of the arbor shank portion 55, this hour hand dial being held resiliently pressed forwardly against the enlarged head portion 56 of the arbor. The time driven rotation of the arbor is transmitted to this hour hand dial, at the rate of one revolution each 12 hours, by a friction driven washer 59 which is mounted on the arbor directly in back of the hour hand dial 14 and which is maintained resiliently pressed in frictional engagement with the back side of the hour hand dial. This friction drive washer 59 has a toothed central opening comprising one or more inwardly extending teeth which engage in the spaces between the splines 57 for positively driving the friction washer 59 with the arbor, while permitting axial sliding movement of the friction washer along the arbor. The stop dial 33, located directly behind the washer 59, also has a central opening 60 of circular contour which can slip freely over the splines 57 so that this stop dial can be rotated relatively to the arbor 23 and can slide axially thereof. The back surface of the driving washer 59 transmits frictional driving torque to the front surface of the stop dial 33. Directly behind the stop dial 33 is a second friction washer 61 which is substantially identical with the friction washer 59, i.e., it has a toothed central opening comprising one or more inwardly extending teeth which engage with the splines 57 so as to compel the washer 61 to rotate with the arbor 23 while permitting sliding motion of the washer therealong. The front surface of this second friction washer 61 exerts frictional driving torque against the back surface of the stop dial 33. The cooking hours or start dial 34 is located directly behind the second friction washer 61 and is maintained in resilient engagement therewith so that the back side of the second friction washer 61 transmits driving torque to the front surface of the start dial 34. Located on the back side of the cooking-hours start dial 34 is a spacing washer 62 having a continuously circular central aperture 63 therein which does not compel the washer to rotate with the splined arbor 23. Directly in rear of the spacing washer 62 is a drive washer 64 having a toothed central opening provided with driving teeth adapted to mesh with the spaces between the splines 57 of the arbor 23. The drive washer 64 is substantially thicker than the first and second friction drive washers 59 and 61. The masking dial 35 has a relatively large central opening 65 therein which has bearing mounting directly upon the outer periphery of the relatively thick drive washer 64. Directly behind the masking dial 35 is another spacing washer 66 having a continuously circular central opening 67 therein, this washer being substantially a duplicate of the spacing washer 62. Bearing against the back side of the washer 66 is a spider spring type of washer 68 which can rotate freely on the splined arbor 23. This spider spring washer 68 bears at the front side against the back of the washer 66 and bears its back side against the front surface of the driving gear 26 provided with a toothed central opening whereby this driving gear positively drives the time driven arbor 23 but is free to slide axially thereof. The back side of the driving gear 26 is adapted to have thrust abutment against a suitable abutment surface to afford a point of thrust reaction for the spider spring washer 68. Preferably this thrust abutment member 70 is in the form of push type of lock washer which is adapted to be pushed forwardly over the rear end of the splined arbor 23 and which will take a wedge-locked position at the innermost point to which it is pushed along the arbor. In the completely assembled relation, the spider spring washer 58 maintains a frictional drive with the splined arbor 23 to the hour hand dial 14, the stop dial 33 and the start dial 34. The masking dial 35 is of thinner section than its mounting washer 64 and no frictional driving force is exerted against it, the masking dial 35 being rotated concurrently with the stop dial 33 through a pin connection which will be later described. The peripheral teeth of the driving gear 26 mesh with the pinion 25 extending forwardly from the front side of the main frame plate 16, this pinion having connection on the back side of the frame plate to a train of speed reduction gearing with the alternating current synchronous motor 20 whereby the splined arbor 23 and the sub-assembly mounted thereon has a continuous time driven rotation of one revolution every 12 hours.

Referring now more particularly to the automatic time tripping functions performed by the stop dial 33 and by the cooking-hours dial 34, and the manner in which these tripping times are pre-set, it should first be noted that the hour hand dial 14 rotates continuously with the time driven splined arbor 23 at all times, and can only be manually shifted in the operation of adjusting the hour and minute hands of the clock through the manual or time setting adjustment. Punched out in the edge or near the edge of the hour hand disk 14, preferably at a point substantially diametrically opposite to the hour hand pointer 12, is an arcuate slot or sight window 71 provided with a central pointer 72. This pointer 72 establishes an index point relative to which the stop cooking time is adapted to be manually pre-set. For designating this index characteristic of the pointer 72, there is marked down on the hour hand dial 14 suitable indicia 73 such as "Stop at—" such indicia indicating that the cooking operation being performed or to be performed by the cooking range will stop at the particular hour which has been manually pre-set in registration with the index point 72.

These stop cooking hours are marked on the front face of the stop-cooking dial 33 which is mounted behind the hour hand dial 14. This stop-cooking dial 33 comprises a semi-circular sector 74 of relatively large radius and a semi-circular sector 75 of relatively small radius, these two sector portions being joined by the radially extending shoulders or edges 76 and 77 forming the ends of the large sector portion 74. The stop cooking numerals, designated at 78, are arranged in a circular time indicating numerical scale of slightly smaller radius than the sector 75, there being twelve of these numerals to designate the twelve hours of the clock dial 33, together with intervening dots or lines designating fractional hour intervals. These hour and fractional hour markings appear in the sight window 71, the particular numeral or fractional hour marking which is in registration with the index point 72 in this window designating the time at which the cooking operation is to stop. In the manual pre-setting operation, this stop-cooking dial 33 can be rotated manually relatively to the hour dial 14 for bringing any desired numeral or fractional hour point in registration with the indexing point 72 for predetermining when the cooking operation is to cease, the stop-cooking dial 33 thereafter rotating continuously with the hour hand dial 14 so that the stop cooking indication is continuously maintained in this rotating sight window 71, once the pre-set time has been established. Such manual pre-setting of the stop-cooking dial 33 predetermines the angular position of a stop cooking tripping pin 79 projecting rearwardly from the dial 33 substantially at the radial shoulder 76, i.e., the angular pre-setting of the stop dial 33 predetermines the position which the tripping pin 79 will have relative to the hour hand pointer 12 at the time that the tripping pin 79 actuates the stop cooking tripping lever to open the timer switch and stop the cooking operation.

Referring now to the start or cooking hours dial 34, this dial is slightly larger than the stop dial 33 and has a continuous circular periphery provided with gear teeth 80. Continuously meshing therewith is the pinion 30 secured to a sleeve 82 on which is mounted the setting knob 29, the start selection time and the cooking hours selection time both being pre-set through this setting knob 29 and its gear connection through pinion 30 with the gear teeth of the start dial 34.

In order to set the number of cooking hours by positioning the cooking-hours dial 34 it is necessary for the housewife to obtain information from a cook book or the like as to the number of hours which should be set for a given weight of the food product to be cooked or baked and the degree to which it should be baked. For example, when it is desired that a given amount of beef be baked or roasted until it is medium well done, it is necessary to multiply the number of pounds of the particular roast by the number of minutes per pound to bake or roast this meat to the desired condition. Pursuant to this invention provision is made for adjusting the start-cooking dial 34 merely by having the housewife adjust the knob 29 in accordance with the actual weight of the meat to be baked or roasted and, if it is beef, noting the character desired for the final product, i.e., whether it is rare, medium or well done.

In order to accomplish this the setting pinion 30 also meshes with peripheral teeth 83 of a cook chart dial 84 which is shown at full scale in FIGURE 4 of the drawings. The cook chart dial 84 is calibrated for a given oven and a given heating means therefor, either electrical or gas units, and to operate at a given temperature, for example 325° F. It will be noted that three scales 85, 86 and 87 are provided on the cook chart dial for registry with windows 88, 89 and 90, respectively, which are located in an extension 91 of the front mounting plate 18. The figures on the scales 85, 86 and 87 are pounds of beef with the outermost scale 85 being employed when it is desired that the beef shall be rare when fully baked. Likewise, the intermediate scale 86 corresponds to pounds of beef and is used when the cooking is to be medium and finally the innermost scale 87 is used when the beef is to be roasted until it is well done. The cook chart dial 84 is also provided with scales 92, 93, 94 and 95 which are arranged to register with windows 96, 97, 98, and 99, respectively, that are located in the extension 91 of the front mounting plate 18. These scales 92, 93, 94 and 95 are employed, as indicated on the extension 91, to indicate the respective weights of other food products such as veal, lamb, pork and poultry. Thus when one of these food products is to be cooked or baked, the appropriate scale 92, 93, 94 or 95 is selected and the knob 29 is adjusted to rotate the cook chart dial 84 until the corresponding weight appears in the corresponding window 96, 97, 98 or 99. As will appear hereinafter, by making this adjustment of the cook chart dial in accordance with the weight of the food product to be cooked or baked, it is unnecessary for the housewife to make any computation involving the weight of the food product and the time required to cook it per pound in order to determine the time required to accomplish the cooking operation.

It will be understood that the calibration of the cook chart dial 84 for the several different scales thereon is based on the assumption that the oven is heated to a fixed temperature, for example the temperature of 325° F. which is indicated at 100 on the extension 91 between the upper set of windows 88, 89 and 90 and the lower set of windows 96, 97, 98 and 99.

The cook chart dial 84 is rotatably mounted on a hub 101 which extends forwardly from an extension 102 from the main frame plate 51. As shown more clearly in FIGURE 2 of the drawings, the extension 102 of the main frame plate 16 overlies the extension 91 from the front mounting plate 18 and is spaced rearwardly therefrom a corresponding distance.

Except for the provision of the extensions 91 and 102 from the front mounting plate 18 and the main frame plate 16 and the provision of the cook chart dial 84, the construction of the timer mechanism otherwise described herein and shown in FIGURES 1, 2 and 3 of the drawings is essentially the same as disclosed in the patent above referred to.

Punched out of the start dial 34 is an arcuate slot 105 having its opposite ends 106 and 107 spaced apart slightly more than 180°. The radius of this slot 105 is such as to permit the stop tripping pin 79 on the stop dial 33 to pass through this slot 105 and to project rearwardly beyond the rear face of the dial 34 a substantial distance. Inscribed on the face of the dial 34 at the end 107 of the arcuate slot is an arrow 108 pointing to this shoulder end 107 of the slot; also inscribed on the face of the dial 34 and extending in curved prolongation of the arrow is the indicia 109 entitled "Cook Hours." The arcuate slot 105 identified by the pointer 108 and indicia 109 constitutes an index point against which are read a series of numerals on masking plate 35 appearing in the arcuate slot 105. These cooking hour numerals 110 extend as an arcuate time indicating scale over approximately 180° of the front face of the masking dial 35, the successive numerals having three dots or lines therebetween dividing each hourly interval into 15 minute periods. These cooking hour numerals 110 and intermediate dots are printed on a distinctively colored arcuate band on the front face of the masking dial 35. Even though the cook chart dial 84 is provided, it is desirable that the cooking hour numerals 110 also be retained since there are other food products, not included in the food products specifically enumerated on the extension 91 for which the cook chart dial 84 is specially calibrated. For example, where the housewife wishes to bake a pie or cake for a given number of hours, in accordance with instructions found in a cook book, it is desirable to retain the cooking hour numerals 110 and the provision for adjusting relative thereto in the manner described herein.

The masking dial 35 is rotatably locked to the stop dial 33 by providing it with a notch 112 in its periphery adapted to receive the stop tripping pin 79 which projects from the stop dial through the arcuate slot 105 and through the notch 112, the rear end of this stop pin projecting substantially beyond the back side of the masking dial 35 in position to engage the stop tripping lever of the normally stationary tripping stops. The peripheral notch 112 in the masking dial 35 is located substantially at the beginning or zero point in the scale of cooking hour numerals 110.

Projecting rearwardly from the back side of the start-cooking dial 34 is a start tripping pin 113 which is adapted to engage the start tripping lever of the normally stationary tripping stops. Such pin 113 is angularly situated in relatively close proximity to the index end 107 of the arcuate sight window 105, and this pin is located outwardly at a radius which will enable the pin to project rearwardly on the periphery of the masking dial 35 into a tripping position lying to the rear thereof. It will be seen from the description thus far that all manual pre-setting operations are transmitted through the pinion 30 to the cook chart dial 84 and to the toothed periphery 80 of the start or cooking-hours dial 34. Hence the cooking-hours dial 34 functions as the master driving dial in the operation of manually establishing the selected times and pounds where the adjustment is made with reference to the cook chart dial 84. The stop cooking time is set up first by rotating the start dial 34 in a clockwise direction sufficiently far to have the end shoulder 106 of the sight window 105 pick up the stop tripping pin 79 and carry it in a clockwise direction to present the desired numeral 78 at the index point 72; or by rotating the start dial 34 in a counterclockwise direction sufficiently far to have the stop shoulder 107 at the other end of the arcuate window pick up the stop tripping pin 79 and rotate the stop disk 33 in a counterclockwise direction sufficiently far to present the desired stop cooking numeral 78 at the index point 22. Alternatively the position of the start dial 34 can be adjusted in accordance with the rotation of the cook chart dial 84 to the weight of the particular food for which it is calibrated in the manner previously described. Thus, when the housewife desires to pre-set the timing mechanism in accordance with a food product that is listed on the extension 91, she rotates the knob 29, without depressing it, to cause the cook chart dial 84 to be rotated until the weight of the particular food product appears in the respective window on the extension 91. Otherwise the adjustment is the same as previously described.

After the stop cooking time has been established in this manner, the cooking hours time is pre-set in either of two ways. One of these involves the rotation of the cook chart dial 84 in one direction or the other independently of the movement of the stop-cooking dial 33 in order to select the scale and weight in each scale corresponding to the particular product that is to be cooked or baked where the same appears on the extension 91. Alternatively, where this is not applicable and the number of hours that the cooking or baking operation is to be carried is known, the start-cooking dial 34 is rotated in one direction or the other also independently of the movement of the stop-cooking dial 33 so as to present the index end 107 of the sight window in registration with the desired cooking hours numeral 110.

By either of the two routes the two steps of the manual pre-setting operation are now complete, the stop cooking time having been set and the number of pounds of food product having been selected or the number of hours for cooking or baking having been selected. The dials 33 and 34 and their respective tripping pins 79 and 113 then revolve continuously with the 12 hour rotation of the splined arbor 23 under the friction clutching action of the friction clutching disks 59, 61 and 64.

Referring now to the mounting and the drive of the minute hand 13, it will be observed that it is staked or otherwise rigidly secured to the front end of the minute hand shaft 22 which extends axially through the splined arbor 23 and its dials 14, 33, 34 and 35, and passes axially through the stationary main bearing sleeve 21 projecting forwardly from the frame plate 16. The pinion 24 has a press fit on sleeve 22 and is formed with successively reduced shoulders on which are mounted the relatively large spur gear 28 and a spring disk establishing a friction slippage clutch. Thus, while the large gear 28 remains locked against any manual rotation because of its gear reduction drive to the synchronous motor 20, the pinion 24 and minute hand shaft 22 can be angularly adjusted relatively thereto in setting the clock hands 12 and 13. The large gear 28 meshes with the continuously rotating pinion 27 mounted on a drive shaft 114 projecting from a gear housing 115 of the electric motor unit 20. Embodied within the gear housing 115 is a train of speed reduction gearing extending from the shaft of the motor rotor to the outwardly projecting shaft 114. Thus, as long as the motor 20 operates, it transmits a continuous time controlled rotation to the large gear 28.

Referring now to the drive for rotating the hour hand dial 14, it will be recalled that the relatively large gear 26 mounted on the splined arbor sub-assembly has continuous mesh with the pinion 25 projecting forwardly from the front side of the frame plate 16. This pinion is formed with a reduced pivot shank extending through the frame plate 16 and to the end of which is secured a relatively large spur gear, shown in the patent above referred to, that is located in the rear of the frame plate 16. Such large gear meshes with the forward portion of the minute hand drive pinion 24 so that the hour hand and minute hand are positively geared together in the proper ratio through the gears 24, 25 and 26.

Referring now to the tripping operations which are performed by the tripping pins 79 and 113 in their continuous time driven rotation, the stop tripping pin 79 intersects the normal position of a spring biased stop tripping lever 116, and the start tripping pin 113 intersects the normal position of a spring biased start tripping lever 117. These two tripping levers 116 and 117 are staked to pivot pins passing through bearing bushings which are anchored in the frame plate 16. On the back side of the frame plate 16, FIGURE 2, the lever 116 carries a tripping stop 118, and the other lever 117 carries a tripping stop 119. These two tripping stops or levers 118 and 119 are so located as to be at angularly spaced intercepting points in the path of rotary movement of a control arm 120 which projects from the switch control shaft 37 and rotates therewith. The switch control shaft 37 is biased by a spring 121 so that it tends constantly to rotate in a counterclockwise direction, as viewed in FIGURE 3, and whenever the control arm 120 is released from a tripping stop, the arm and shaft tend to rotate in the spring biased direction. The trip lever 118 is formed with a rearwardly projecting shoulder or lug 118S adapted to be engaged by the control arm 120, and the tripping lever 119 is likewise formed with a stop shoulder or lug 119S adapted to be engaged by the control arm 120. These two tripping levers 118 and 119 are normally held in these intercepting or blocking positions by action of springs as described in the patent above referred to, column 14, lines 49–62. In the normally stationary spring biased position of the tripping stop assembly 118, the cam-shaped lever 116 occupies a position in the circular path of movement of the tripping pin 79, and the associated stop lever 118 occupies a stop position in the path of movement of the switch shaft control arm 120. Thus, in the spring biased normally stationary position of the tripping stop assembly 117, 119, the cam lever 117 occupies a position in the circular path of movement of the tripping pan 113 and the stop lever 119 occupies an intercepting or stop position in the path of rotary movement of the switch shaft control arm 120.

The biasing spring 121 which exerts a constant biasing torque on the switch control shaft 37 tending to rotate it in the counterclockwise direction as viewed in FIGURE 3 of the drawings is in the form of a helically coiled tension spring having one end 122 hooked to the shaft assembly and having its other end 123 hooked to the relatively stationary point. The spring 121 is arranged to wrap around a hub 124 which is secured to the control shaft 37 and which mounts the control arm 120. The biasing spring 121 tends to rotate this control arm 120 from the first to the fourth positions designated by the four letters on the front end of the control knob 36: "A" (Automatic); "C" (Cooking); "O" (Off) and "M" (Manual). When the nose of the control lever 120 is latched against the stop shoulders 119S of tripping stop 119, the arm 120 is in the "A' (Automatic) or set position, at which time the control switch is in the open circuit position. The control arm cannot be manually rotated in a clockwise direction beyond this "A" position because the back of the arm 120 then strikes a stop lug which is punched rearwardly from one margin of an opening in the frame plate 16. When the start cooking pin 113 oscillates the tripping stop 117, 119 in a counterclockwise direction, the nose of the arm 120 slips off the tripping lug 119S with the result that the arm 120 snaps downwardly under its spring bias applied by the spring 121 into engagement with the stop surface of lug 119S of tripping lever 118. This corresponds to the "C" (Cooking) step in the cycle at which time the contacts of the timer control switch are closed for starting the cooking operation. When the stop cooking pin 79 imparts clockwise oscillation to the tripping stop assembly 116, 118 the tripping surface 118S is swung out of the path of movement of the arm 120, thereby allowing it to be snapped down into its third position in engagement with a stop shoulder. This third position is the "O" (Off) position, at which time the contacts of the timer control switch are opened for stopping the cooking operation. This third position stop shoulder consists of a lug bent rearwardly from a latching plate which is pivotally mounted on a pivot pin staked in the frame plate 16 and is held in the normal position by the helical biasing spring 121 which has its lower end 123 hooked to a lug projecting rearwardly from the pivoted latch plate as described in the patent above referred to at column 16, lines 15–25. In this normal position in which the latch plate is held by the biasing spring 121, it intercepts the normal arc of movement of the control arm 120 for defining the third position thereof; viz. the "O" (Off) position with the switch contacts open for stopping the cooking operation. The fourth or manual position is described in the patent above referred to in column 16, lines 31–57.

Beginning at column 17, line 72, of the patent above referred to and continuing through to line 11 of column 19 it is described how a switch operating arm 125 carried by the insulating panel 40 rotates with the control arm 120 for operating a switch yoke 126 that, in turn, operates a contact arm 127 and a contact 128 carried thereby into and out of engagement with a contact on a terminal post 129 also carried by the insulating panel 40.

Where the circuit through the contact arm 127 is employed either for conducting the full load current for the heating elements for an electric range or is used for conducting current for controlling the operation of a solenoid to control a gas valve employed in conjunction with a gas heated oven, the operation thereof is controlled in the manner described for the purpose of completing the circuit by moving the switch operating arm 125 to cause the contact 128 to engage a contact on the terminal post 129 at the beginning of the cooking or baking cycle and then cause the circuit to be opened at the pre-set time when the cooking cycle is to be completed.

For performing the cooking or baking operation employing the cook chart dial 84 described hereinbefore it will be understood that the housewife sets the adjustable thermostat employed for controlling the heat supplied to the oven to a predetermined temperature, for example the temperature of 325° F. to correspond to the temperature at which the cook chart dial 84 is calibrated. It will be understood that the oven can operate at another temperature, such as 350° F., but in that case it is necessary to employ a cook chart dial 84 having a different calibration.

As disclosed in application Serial No. 850,562 filed November 3, 1959, now abandoned, an additional thermostat can be provided and arranged to operate only at the fixed temperature, for example 325° F., for which the cook chart dial 84 is calibrated. When the knob 36 is moved to the automatic position the circuit to the adjustable thermostat is opened and, when the cooking or baking operation starts, the circuit is shifted to the fixed thermostat for the duration of the automatic cycle.

Another embodiment of the invention is illustrated in FIGURES 5 and 6 of the drawings. It will be observed that these figures correspond, generally, to FIGURES 1 and 3 of the application above referred to. The reference character 136 refers, generally, to a timing mechanism the details of construction of which, except for the modification as hereinafter set forth, are found in the application above referred to and will not be repeated here except insofar as is necessary for an understanding of the present invention.

The timing mechanism 136 includes a rectangular face plate 137 on which there is applied a clock dial 138. Overlying the face plate 137 is a rectangular cover glass that is supported in a bezel frame 140 which surrounds it and the rectangular face plate 137. Cooperating with the clock dial 138 are an hour hand 141 and a minute hand 142. A time setting knob 143 projects forwardly from the rectangular face plate 137 and outside of the cover glass 139 for setting the hour and minute hands 141 and 142 to indicate the correct time. The timing mechanism 136 also can be provided with an interval timer and to this end interval timer numerals 144 are provided within the clock dial 138 and an interval timer pointer 145 is arranged to move therepast. An interval timer setting knob 146 is positioned centrally of the clock dial 138 and is located outside of the cover glass 139 for adjusting the position of the interval timer 145 to the desired position relative to the interval timer numerals 144.

The timing mechanism 136 is operated automatically by a synchronous electric motor 147 which is mounted on a base plate 148 that is spaced rearwardly from the rectangular face plate 137. Also mounted on the base plate 138 is a switching mechanism 149. It will be understood that the electric motor 147 drives the hour and minute hands 141 and 142 in proper timed relation in order to indicate the time of day. Also the electric motor 147 operates the interval timer pointer 145 when it is set in operation. In addition, as described in detail in the application above referred to, provision is made for operating the switching mechanism 149 to complete a circuit for effecting the application of heat energy to the oven of the range with which the timing mechanism 136 is associated. Also the arrangement is such that the switching mechanism 149 will be operated to terminate the application of heat energy at the time that it is desired to stop cooking.

In order to pre-set the timing mechanism 136 to operate the switching mechanism 149 and stop further application of heat energy to the oven, a stop time knob 150 is provided and it is mounted on the face plate 137 and projects forwardly from the cover glass 139. As described in the application above referred to the stop time knob 150 is arranged to rotate a stop time dial 151 provided with a scale 152 a portion of which can be seen in the stop time sight window 153 that is provided in the face plate 137. An index 154 centrally located with respect to the stop time sight window 153 indicates the time along the stop time scale 152 at which the switching mechanism 149 will be operated to discontinue further application of heat energy to the oven.

In accordance with this invention provision is made for setting the start time of the timing mechanism 136 in accordance with the weight and nature of the food product that is to be baked or roasted. For this purpose a weight set knob 155 is provided and it corresponds to the hours to cook set knob described in the application above referred to. The weight set knob 155 is located directly underneath the stop time knob 150 and, like it, the weight set knob 155 is positioned outside of the cover glass 139 where it can be adjusted by the housewife. The weight set knob 155 is arranged to adjust the position of an hours to cook dial 156 which corresponds to the hours to cook dial referred to in the above application. However, in accordance with this invention the hours to cook dial 156 need not be provided with a scale. Meshing with the hours to cook dial 156 is a pinion 157 which is carried by a shaft 158 that is mounted on the rear of the base plate 148. The pinion 157 engages teeth 160 of a cook chart dial 161 which is similar to or may be identical with the cook chart dial 84 shown in FIGURE 4 and described above. The cook chart dial 161 is rotatably mounted on a shaft 162 which is carried by an extension 163 of the base plate 148. It will be understood that, on setting of the hours to cook dial 156 by the rotation of the weight set knob 155, the cook chart dial 161 is rotated.

The cook chart dial 161, like the cook chart dial 84, is provided with scales 165, 166 and 167 which indicate weight in pounds of beef, the scales being individual to the desired condition of the final product, respectively, rare, medium and well done. The scales 165, 166 and 167 register with windows 168, 169 and 170 in the face plate 137.

It is desirable to provide additional scales on the cook chart dial 161 and to calibrate them in accordance with the weights in pounds of other food products such as veal, lamb, pork and poultry. Accordingly, scales 172, 173, 174 and 175 are provided, respectively individual to each of these products and the calibration of the respective scales is determined by the time and temperature characteristics of the particular oven with which the timing mechanism 136 is associated and also the time and temperature characteristics required to cook or roast the respective meat product. The scales 172, 173, 174 and 175 register, respectively, with windows 176, 177, 178 and 179 in the rectangular face plate 137.

It will be understood that the scales on the cook chart dial 161 are calibrated at a particular temperature at which the oven with which the timing mechanism 136 is associated is to operate. For example, these scales may be calibrated on the assumption that the oven is set to operate at a temperature of 325° F., as indicated at 181.

As pointed out hereinbefore a fixed or pre-set thermostat can be employed in addition to the usual adjustable thermostat and provision then is made for switching the oven control circuit from the adjustable thermostat to the fixed or pre-set thermostat as a result of pulling out the stop time knob 150. At the beginning of the cooking or baking cycle the control of the oven is by the fixed or pre-set thermostat which operates at 325° F.

Near the periphery of the cook chart dial 161 a cook hour scale 182 can be provided and it is visible through a window 183 located at the upper right hand corner of the face plate 137. An index 184 on the face plate 137 is located centrally of the window 183 and indicates with respect to the cook hour scale 182 either the number of hours required to cook a given weight of a particular meat product or the remaining hours that must elapse before the cooking or roasting operation is completed as pre-set by the stop time knob 150 after having been started by adjustment of the weight set knob 155.

Employing the timing mechanism 136, constructed as disclosed in the application above referred to and modified in accordance with the construction outlined above, the sequence of operation is as follows:

(1) The housewife adjusts the thermostat of the range to the temperature indicated at 181 so as to maintain this temperature, 325° F., during the time that the cooking or roasting operation is being carried out. This step is unnecessary when the fixed thermostat is provided.

(2) The stop time knob 150 is pulled out to open the switch contacts and turned to operate the stop time dial 151 until the desired stop time appears in registry with the index 154, for example 6 o'clock.

(3) The weight set knob 155 is adjusted to rotate the cook chart dial 161 to the proper position. For example, if a six pound beef roast is to be cooked, and it is to be medium, the weight set knob 155 is rotated until the numeral 6 appears centrally in the window 169 as illustrated in FIGURE 5. The same setting would be used for a seven pound beef roast, to be rare, or a five pound beef roast to be well done. Likewise, a five pound veal or lamb roast would receive the same setting as would three pounds of poultry.

(4) The foregoing steps can be carried out and the roast placed in the oven at any time before 2 o'clock since, for the particular setting indicated, the cooking time is four hours as indicated by the cook hours scale 182. At the pre-set time determined by the setting of the cook chart dial 161, the electric motor 147 automatically operates the switching mechanism 149 to effect the application of heat energy to the oven and the thermostat automatically maintains the oven temperature at the pre-set value, for example 325° F.

(5) At the time set on the stop time dial 151, the electric motor 147 automatically operates the timing mechanism 136 to operate the switching mechanism 149 and discontinue further application of heat energy to the oven. The housewife removes the meat from the oven, returns the adjustable thermostat to the zero position and depresses the stop time knob 150, as described in the application above referred to, to index the switching mechanism 149 of the timing mechanism 136 back to the "On" or "Closed" position. The range now can be operated manually as desired.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a system for controlling the application of energy generated by electricity, fluid fuel or the like to heating means for cooking a food product such as meat requiring a predetermined time at a given temperature depending upon the weight of the food product, in combination, a timing mechanism having a visible face plate, means on said timing mechanism for manually adjusting it to terminate the application of energy to the heating means at a predetermined time, cook chart means carrying a plurality of scales each visible through a window individual thereto in said face plate and calibrated in units of weight of a different food product related to the operating characteristics of the heating means at the given temperature, means on said face plate for manually adjusting said cook chart means with respect to a window corresponding to the food product to be cooked to display the weight thereof in its window, and means for applying energy to the heating means as a result of the setting of said cook chart means at a time sufficient to complete the cooking operation of the particular food product at the time that the application of energy to the heating means is terminated.

2. In a system for controlling the application of energy generated by electricity, fluid fuel or the like to heating means for cooking a food product such as meat requiring a predetermined time at a given temperature depending upon the weight of the food product, in combination, a timing mechanism having a visible face plate, means on said timing mechanism for manually adjusting it to terminate the application of energy to the heating means at a predetermined time, a cook chart dial rotatably mounted on said timing mechanism and carrying a plurality of concentric scales each visible through a window individual thereto in said face plate and calibrated in units of weight of a different food product related to the operating characteristics of the heating means at the given temperature, means on said face plate for manually rotating said cook chart dial with respect to a window corresponding to the food product to be cooked to display the weight thereof in its window, and means for applying energy to the heating means as a result of the setting of said cook chart dial at a time sufficient to complete the cooking operation of the particular food product at the time that the application of energy to the heating means is terminated.

References Cited in the file of this patent

UNITED STATES PATENTS

| | | |
|---|---|---|
| 2,715,703 | Schuck | Aug. 16, 1955 |
| 2,723,335 | Hotchkin | Nov. 8, 1955 |
| 2,856,507 | Naxon | Oct. 14, 1958 |
| 2,886,106 | Gallagher et al. | Mar. 12, 1959 |